US008892877B2

(12) United States Patent
Molau

(10) Patent No.: US 8,892,877 B2
(45) Date of Patent: Nov. 18, 2014

(54) METHOD AND DEVICE FOR ACCESSING FILES OF A SECURE FILE SERVER

(75) Inventor: Sirko Molau, Seysdorf (DE)

(73) Assignee: Bayerische Motoren Werke Akteingesellschaft, Munich (DE)

( * ) Notice: Subject to any disclaimer, the term of this patent is extended or adjusted under 35 U.S.C. 154(b) by 97 days.

(21) Appl. No.: 13/473,851

(22) Filed: May 17, 2012

(65) Prior Publication Data

US 2012/0272061 A1    Oct. 25, 2012

Related U.S. Application Data

(63) Continuation of application No. PCT/EP2010/066830, filed on Nov. 4, 2010.

(30) Foreign Application Priority Data

Nov. 20, 2009    (DE) .......................... 10 2009 054 128

(51) Int. Cl.
*H04L 29/06* (2006.01)
*G06F 21/62* (2013.01)

(52) U.S. Cl.
CPC .................................. *G06F 21/6227* (2013.01)
USPC ........... 713/165; 713/150; 713/151; 713/153; 713/164; 713/167; 713/182; 713/183; 713/185; 713/186; 713/193; 726/1; 726/2; 726/4; 726/17; 726/19; 726/21; 726/26; 726/27; 726/30; 707/781; 707/783; 707/784; 707/785

(58) Field of Classification Search
USPC .......... 726/1–4, 16–21, 26–30; 713/164–167, 713/182–194, 150–153; 707/781–188, 707/781–788
See application file for complete search history.

(56) References Cited

U.S. PATENT DOCUMENTS

| 7,315,859 | B2 * | 1/2008 | Samar .................................... 1/1 |
| 7,660,902 | B2 * | 2/2010 | Graham et al. ................ 709/229 |
| 7,698,742 | B1 * | 4/2010 | Ferrie .............................. 726/24 |
| 8,140,847 | B1 * | 3/2012 | Wu .................................. 713/175 |
| 2003/0110169 | A1 * | 6/2003 | Zuili et al. ......................... 707/9 |
| 2004/0153642 | A1 * | 8/2004 | Plotkin et al. .................. 713/150 |
| 2007/0174362 | A1 | 7/2007 | Pham et al. |
| 2007/0300062 | A1 | 12/2007 | Osmond et al. |
| 2009/0172411 | A1 * | 7/2009 | Kershaw et al. .............. 713/189 |
| 2009/0210721 | A1 * | 8/2009 | Phillips ......................... 713/182 |

FOREIGN PATENT DOCUMENTS

WO    WO 02/03603 A1    1/2002

OTHER PUBLICATIONS

German Search Report dated May 10, 2010 with partial English translation (nine (9) pages).
International Search Report dated Feb. 3, 2011 with English translation (four (4) pages).
International Preliminary Report on Patentability dated Jun. 12, 2012 (five (5) pages).

* cited by examiner

*Primary Examiner* — Madhuri Herzog
(74) *Attorney, Agent, or Firm* — Crowell & Moring LLP

(57) ABSTRACT

A method and a device are provided for accessing data files of a secure file server, wherein a user or a process is authenticated; wherein access to the data files of the secure file server takes place by way of an encryption module of the secure file server; wherein the encryption module comprises an encryption agreement of a centralized security application; and wherein the access of the authenticated user or process to the secure file server takes place by way of an encrypted protocol taking into consideration the encryption agreement. Such a device may be included in a corresponding computer network.

17 Claims, 3 Drawing Sheets

Fig.3

| Number | User | Service/Process | Action | Reaction |
|---|---|---|---|---|
| 01 | | Anti-Virus | | Access allowed; encryption/decryption of the content |
| 02 | | DFSR | | Access allowed |
| 03 | | Backup | | Access allowed |
| 04 | | Quota | | Access allowed |
| 05 | Authorized user | | | Access allowed; encryption/decryption of the content |
| 06 | Migrations-Administrator | | Write | Access allowed; encryption of the content |
| 07 | Migrations-Administrator | | Read | Access allowed |
| 08 | Administrator | | | Access allowed |
| 09 | System | | | Access allowed |
| 10 | | | | Access denied |

METHOD AND DEVICE FOR ACCESSING FILES OF A SECURE FILE SERVER

CROSS-REFERENCE TO RELATED APPLICATIONS

This application is a continuation of PCT International Application No. PCT/EP2010/066830, filed Nov. 4, 2010, which claims priority under 35 U.S.C. §119 from German Patent Application No. DE 10 2009 054 128.4, filed Nov. 20, 2009, the entire disclosures of which are herein expressly incorporated by reference.

BACKGROUND AND SUMMARY OF THE INVENTION

The invention relates to a method and a device for accessing files of a secure file server. Furthermore, a computer network with such a device is proposed.

There exist solutions for providing files or, more specifically, data, especially by use of centralized computers (file server). Administrators are usually provided with rights that enable an expanded access to files and/or the computer network as compared to normal users. It is often the case that administrators gain access to the whole database.

It is precisely in the case of large computer networks that the manipulation and, in particular, the storage, of highly confidential data present a problem. For example, one goal is to keep the number of persons who have access to these data as small as possible. In particular, not all administrators should have access to highly confidential data. Therefore, it is often the case that dedicated and isolated areas that are protected, in particular, with firewalls and security zones, are defined. In order to make these areas available (maintenance, control, security, monitoring, etc.), it is necessary to have special operating teams that differ from the normal administrators and exhibit, in particular, a high degree of confidentiality. These additional operating teams often have to ensure around-the-clock support for the file servers. This feature incurs not only the costs for the additional hardware but also costs for the time-consuming administration of the file servers in the isolated areas. An additional drawback is that the operating teams have access to the highly confidential data.

With the prior art encryption applications it is possible to store data in an encrypted form on a storage medium. However, this method has the drawback that until the confidential data is encrypted, said confidential data may be accessed in the computer network as transparent data.

Furthermore, it is disadvantageous that the file server of certain file servers that are used by default is itself unprotected. Hence, such a file server also allows access to highly confidential data.

There are also solutions that define the access to the data files by use of a certificate and rights management. However, such solutions are cumbersome in terms of the administration and manipulation by the end user, in particular if several users have to access data files in one directory. In this case all users need the correct key (or rather the correct certificate). This is very complicated and time-consuming, for example, in a dynamic environment—that is, where various staff members work together in different teams—because a personal key, or more specifically a personal certificate, would have to be generated and managed for and distributed to each staff member/team combination.

The object of the present invention is to avoid the aforementioned drawbacks and to provide, in particular, a method for manipulating confidential data in a way that is efficient, largely secure and simple and transparent to the user.

The invention achieves this and other objects by providing a method for accessing files of a secure file server, wherein a user or a process is authenticated; the access to the files of the secure file server takes place by way of an encryption module of the secure file server; the encryption module comprises an encryption agreement of a centralized security application; and the access of the authenticated user or process to the secure file server takes place taking into consideration the encryption agreement.

In particular, the encryption agreement (policy) can be made available to the encryption module of the file server by the centralized security application, wherein the file server actively requests the encryption agreement, or wherein the encryption agreement is transferred to the file server without such a request.

The centralized security application is an application that runs preferably on a separate computer. The encryption agreement can have, for example, encryption rules and/or keys to access the data files of the secure server.

At this point it must be pointed out that the secure file server includes at least one computer that has an encryption module. The "secure file server" differs in this way from a server without an encryption module. In this case the actual security of the "secure" file server is not further quantified; this security can be provided, as a function of the application, for example, by use of suitable measures (structural measures, access control, additional software) in order to protect the "secure server."

Furthermore, it must be pointed out that the centralized security application involves preferably an application that satisfies special security requirements. It can run, for example, on a specifically protected computer (for example, protected by special encryption hardware), to which only a small number of persons having a special fiduciary position have access. The centralized security application can provide encryption agreements for several secure file servers. The centralized arrangement facilitates the complex administration resulting from the high security requirements. Moreover, it is advantageous that the administration of the centralized security application requires only a reduced effort compared to the administration of a file server; and, thus as a result, operating persons for the centralized security application do not have to be available twenty-four hours a day, seven days a week.

The process can be a service in the computer network—for example, a system service of the secure file server.

In this context it is advantageous that the encryption agreement can be defined, or more specifically specified, in a very granular way. In particular, for example, the context information (for example, which process accesses which file(s)) can be used to control the access to files of the secure file server.

The approach described herein applies in general to servers that store confidential data. The file server mentioned herein can also be an application that processes sensitive data. The application is recognized by the signature of the service or by way of the executing user, and the encryption agreement can provide the assurance that only for this application are the data encrypted.

It is a further aspect of the invention that the user's access is controlled according to the following role model: if it involves an authorized user, then the files are encrypted and/or decrypted by the encryption module of the secure file server; if it involves an administrator, then access is allowed, but the files are neither encrypted nor decrypted; if it involves an unauthorized user, then access is blocked.

Correspondingly, it is possible to control the access of the process (for example, the system service). In particular, it is possible that the role model for users and/or processes are stored in the encryption agreement.

It is also a further development that the access of the authenticated user or process to the secure file server takes place by way of an encrypted connection taking the encryption agreement into consideration.

It is an additional improvement that the user is authenticated by way of his user identification.

In particular, the role of the user can be determined by use of his user identification. This feature is advantageous because the user authenticates himself to the system in a way that is known to him (for example, within the framework of logging onto the system), and his access to the secure file server is controlled transparently to the user (that is, without more effort on his part). For the authorized user the solution proposed herein represents, for example, an additional storage medium, which he can access (read and write access). At the same time the encryption takes place seamlessly preferably from the workstation computer to the secure file server (end to end encryption), so that there is no possibility of gaining access to the unencrypted data, based on the connection between the workstation computer and the secure file server.

The term "end to end" encryption is defined herein, in particular, as a two-step strategy. The encryption of the data files can be performed centrally on the file server; the path between the workstation computer (client) and the file server can be protected separately (encrypted).

In particular, it is a further development that the user is authenticated with a user identification by way of a workstation computer, and that an encrypted transfer of files between the workstation computer and the secure file server takes place.

It is also a further development that the encrypted transfer between the workstation computer and the secure file server takes place by means of the IPsec protocol. As an alternative it is possible that the encrypted transfer between the workstation computer and the secure file server takes place by means of encryption on a higher protocol level (for example, TLS/SSL).

Furthermore, it is a further development that the access or the attempted access to the secure file server is stored and/or monitored. As a result, it is advantageous that a security of the computer network and, in particular, the confidential files can be documented.

According to an additional further development, the process is authenticated by the centralized security application.

A subsequent improvement consists of the fact that the process is authenticated by use of a signature by the file server, in particular, the encryption module of the file server. This feature can ensure that the process was not manipulated. This assurance is especially important for such processes that have access to the confidential data of the secure server.

In one embodiment access to the files of the secure file server is controlled by way of the encryption agreement as a function of the type of process.

An alternative embodiment consists of the fact that the process is an anti-virus program that is given full access to the files of the secure file server by way of the encryption agreement.

Additional examples of processes that have full access to the files of the file server by way of the encryption agreement are: e-discovery processes, revision processes, indexing and search processes.

In a further embodiment the file contents are encrypted by the encryption module and that metadata of a file are not encrypted.

In another embodiment the data files of the secure file server are backed up, optionally together with the files of a normal file server, on a storage medium.

The storage medium can be a storage array and/or any back-up medium—for example, the local hard disk, archiving media. In this case it is an advantage that the data files of the secure file server can be treated just like the files of a normal file server. In particular, this feature makes it possible for the administrators to carry out, for example, the backup of the confidential data without being able to decrypt the data.

The aforementioned object is achieved with a device that is intended for making available data files and that includes: an encryption module, wherein the encryption module comprises an encryption agreement of a centralized security application; a processing unit that is configured in such a way that: (i) a user or a process can be authenticated; (ii) the access to the files takes place by way of the encryption module; and (iii) the access of the authenticated user or process takes place taking into consideration the encryption agreement.

For the sake of completeness it must be pointed out once more that the encryption agreement can be considered in addition to the authorization at the file server.

Correspondingly, the processing unit is configured for carrying out one of the additional actions described herein.

As a result, the aforementioned engineering object is also achieved with a device comprising a processing unit, wherein the processing unit is configured in such a way that the method described herein can be carried out.

The processing unit can be, for example, an analog or digital processing unit; it can also be designed as a processor and/or at least a partially hard-wired circuit configuration that is configured in such a way that the method can be carried out as described herein.

The processor can be any kind of processor, calculator or computer with the respective necessary periphery (memory, input/output interfaces, input/output devices, etc.) or can include such a processor. Furthermore, a hard-wired circuit unit—for example, an FPGA, an ASIC or any other integrated circuit—can be provided.

According to one embodiment, the device is a secure file server in a computer network. As stated above, the secure file server differs from a non-secure or also normal file server in that it has an encryption module.

The aforementioned object is also achieved by way of a computer network that includes at least one device, as described herein.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows an exemplary table of the encryption rules that can be, in particular, a part of an encryption agreement (policy).

DETAILED DESCRIPTION OF THE DRAWINGS

In particular, the approach proposed herein can be based on the following (logical and/or physical) components:

a) at least one file server makes available the data files (files). For a highly available system at least two file servers (for example, Windows servers) can be used. The files and directories can be kept in a synchronized state on a plurality of file servers by way of a replication of the files (distributed file system replication, DFSR);

b) a software or hardware-based encryption is made available on the file server;

c) the IPsec protocol is used for encrypting the communication between a client (for example, a workstation computer of a user) and the file server. The IPsec protocol is a security protocol, which is supposed to ensure the confidentiality, the authenticity and the integrity of the communication over IP networks. RFC 2401 and/or RFC 4301 describe the architecture of IPsec.

Figure 1:
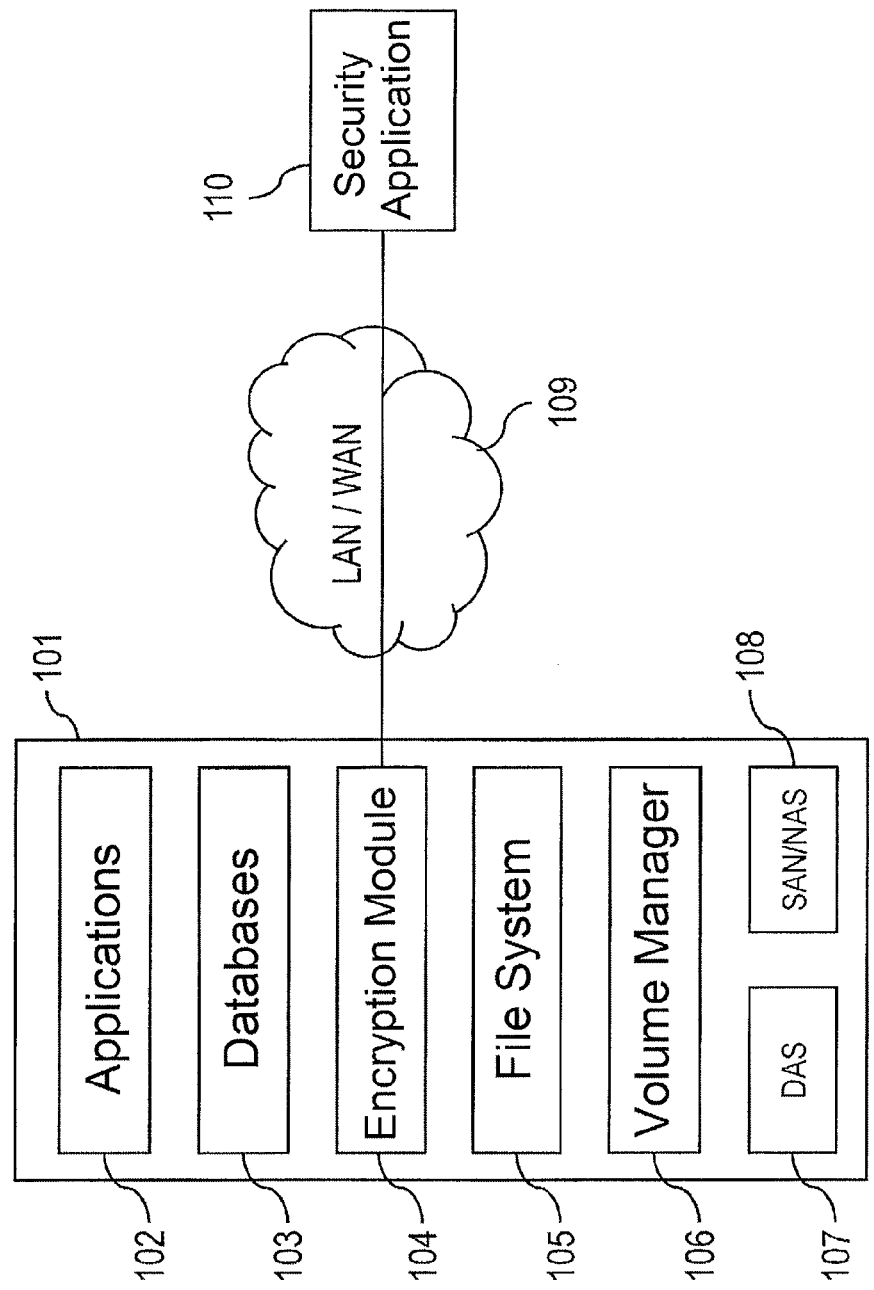
FIG. 1 is a block diagram including an encryption module as an addition to a data file system (file system) of a Windows server.

It is proposed that at least one file server be expanded by one encryption module (policy enforcement module, PEM). FIG. 1 shows a block diagram with an encryption module 104 as an addition to a data file system (file system) of a Windows server 101.

The Windows server 101 includes applications 102 that access databases 103. The databases 103 and the applications 102 are shown in FIG. 1 only as options and can also be omitted. A secured access to a security application 110 is carried out by way of the encryption module 104 (thus, by use of an encrypted protocol) via a network 109 (for example, a LAN or a WAN). The security application 110 makes available the encryption agreements (policies) and/or the keys and/or the signatures of the processes for the encryption module 104. The security application 110 can be used as a central unit for a plurality of servers (for example, a Windows server, a Linux server or a server with any operating system, also in combination) and can fulfill the correspondingly high security requirements. The security application 110 can be set up on a central computer that is protected against unauthorized access by way of a suitable design or software.

Furthermore, the server 101 is logically connected to a directly attached storage medium 107 (direct attached storage, DAS) and/or to a storage network (storage area network, SAN) and/or a storage medium in the network (network attached storage, NAS) 108. A volume manager 106 is responsible for the attachment of the storage medium 107 to a data file system 105, so that the encryption module 104 uses locally the services of the data file system 105.

The encryption module 104 can intercept any access to a file and check whether it involves an area of the specified encryption agreement (policy) and—if this is the case—whether access shall or shall not be granted according to the specified encryption agreement (policy). In particular, decisions regarding the following actions can be made:

(a) access is not allowed or more specifically is blocked ("access denied");

(b) access is allowed, but the data are neither encrypted nor decrypted;

(c) access is allowed, and the data are encrypted while writing and decrypted while reading.

In addition, access can be optionally stored or more specifically monitored.

Preferably the file contents are encrypted; the metadata (name, size, owner of a file) remain unencrypted.

Figure 2:
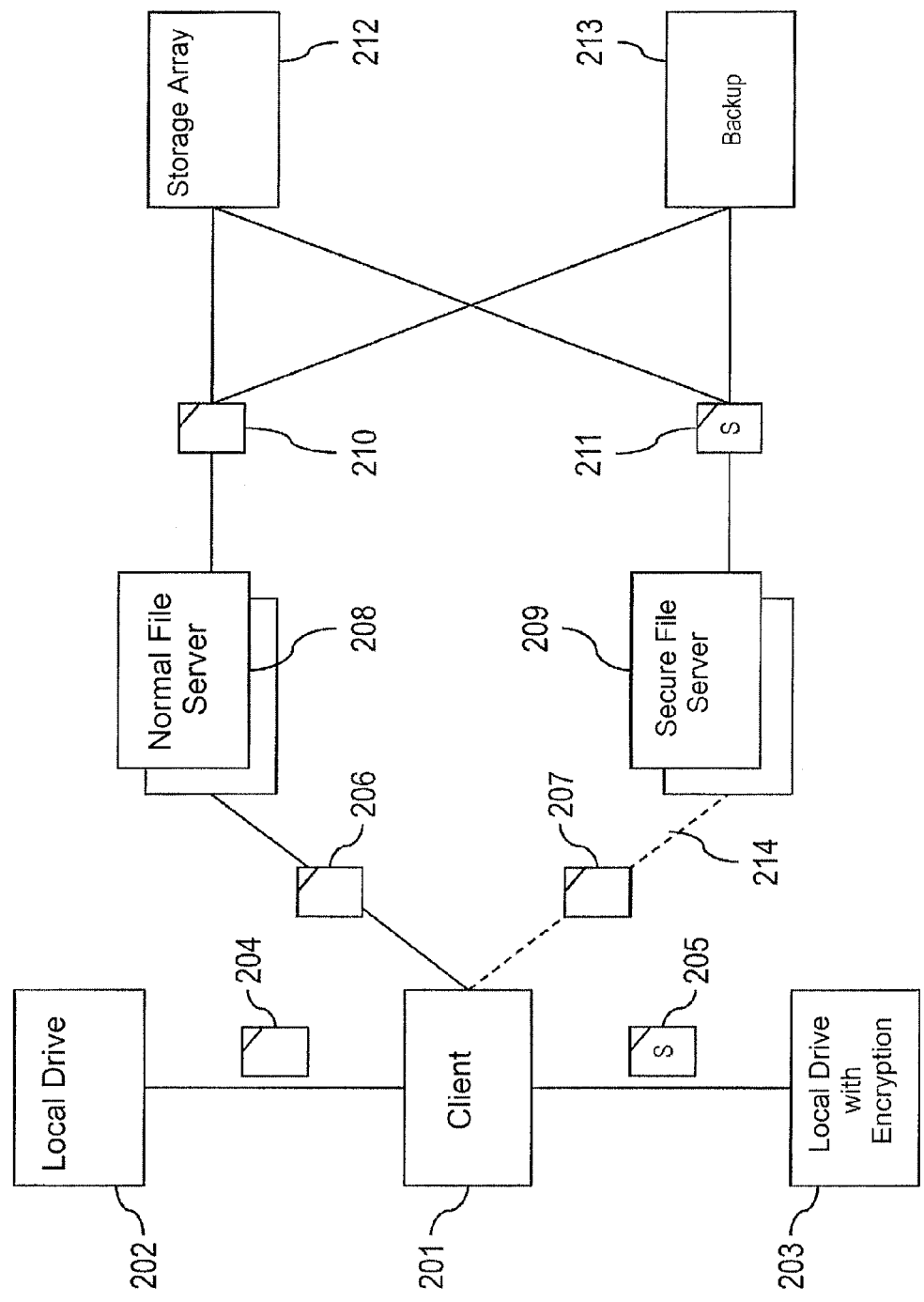
FIG. 2 is a block diagram that shows the file processing in one part of a computer network.

FIG. 2 shows a block diagram that explains the data processing in one part of the computer network. In this case both the files with normal confidentiality and the highly confidential files are processed.

A client 201 (computer of an authorized user) has a local drive 202 without an encryption capability and/or has a local drive 203 with an encryption capability. Normal files 204 are saved on the drive 202, and confidential files 205 are saved on the drive 203. In this context it must be mentioned that the drives 202 and 203 can be designed on a single physical medium—for example, a hard disk.

Normal files 206 can be transferred from the client 201 to a normal file server 208 over an unencrypted connection; confidential files 207 are transferred from the client 201 to the secure file server 209 over an IPSec connection 214. The file server 209 may exhibit an architecture according to FIG. 1, in which it encrypts the confidential files 207 by use of the encryption module 104 and saves the encrypted files, for example, on a local drive (not shown) or on the storage array 212, which in the case of a SAN is addressed like a local hard disk for the file server and in the case of an NAS corresponds to a network drive.

The files of the normal file server 208 and of the secure file server 209 are stored on a storage array 212 and/or on a backup medium 213 (for example, in the form of storage tapes). In so doing, normal files 210 from the normal file server 208 and the encrypted files 211 from the secure file server 209 are stored on the storage array 212 and/or the backup medium 213.

The approach proposed herein can use, for example, the role model presented as follows:

(a) if access by an authorized person occurs, then the data are encrypted or decrypted;

(b) if access by an administrator occurs, then the data are not encrypted or decrypted;

(c) if access by an unauthorized user occurs, then the access is blocked.

In this respect it is advantageous that the proposed solution is totally transparent to the authorized user—that is, for him the secure file server acts exactly like the normal file server. The authorized user is totally unaware that the data are stored in an encrypted form or that access to confidential data takes place over the encryption module of the secure file server. Even an administrator of the secure file server is also initially unaware of the encryption, because the metadata of the files are unencrypted, and he can perform his daily tasks unimpeded: copy, restore, migrate files, etc. If, however, he attempts to open an encrypted file, he will receive only the encrypted, not the unencrypted content.

The encryption agreement (policy) and the key can be managed and stored in specifically hardened security applications (110, see FIG. 1). The security applications can be made available in a centralized manner, and access can be restricted to a few internal staff members. Configuration changes are rarely to be expected for the security applications. Therefore, an extremely high availability of the operating personnel is not mandatory. That is, it is possible to make sizeable cost cuts.

A distinction between authorized users, unauthorized users and administrators can be made by use of a user identification (User ID).

In order to satisfy stringent security requirements, authorized users and administrators can be configured directly at the security application. Frequently it is also adequate with respect to conventional security requirements that the authorized users and administrators are listed in the usual directory services (for example, active directory security groups). In this way the management of the security application can be achieved with less effort and expense. The security groups are monitored preferably in order to detect any manipulation, for example, by domain administrators.

Optionally, encryption rules are incorporated. Thus, users (authorized, unauthorized) and administrators can be recognized, and, as a function of their user identification, access to sensitive data can be allowed, allowed to a limited degree or denied. In addition, it is possible that services or processes—for example, system services—are also recognized and, as a function of a specific service, different types of access to sensitive data are permitted or denied.

FIG. 3 shows an exemplary table of the encryption rules. In this table an empty action box indicates that there is no restriction—for example, with respect to reading or writing. In contrast, an entry in the action box indicates the type of restriction(s).

An anti-virus system service (line 1) (other system services are also considered, for example, an indexing service) gains full access (for any action, that is, reading and/or writing) to the sensitive files; these files are also decrypted for the virus scan. A DFSR service of the replicated, distributed file system gains only access to the encrypted files (line 2) as well as a backup service (line 3) and a quota service (line 4).

An authorized user gains full access to the sensitive files (line 5).

In order to migrate confidential files from another file server to the secure file server, either the authorized user has to become active (if he is writing, then encryption takes place) or a so-called migration administrator has to become active. For this purpose a normal administrator can acquire temporarily the role of the migration administrator and can copy the files from the normal file server to the secure file server. In this case the migration administrator has no read access to the files of the secure file server. However, he can store files on this file server by means of a write access. Preferably the administrator gives up his role of migration administrator once the migration has been completed, so that undesired effects (double encryption) when performing subsequent tasks on the secure file server (lines 6 and 7) are avoided. Otherwise the system users (system services) and administrators gain access to the encrypted files (lines 8 and 9). All other users or services gain no access (line 10).

Preferably files of the individual services can be provided with a signature in order to exclude manipulation of data files. It is also possible that the anti-virus system service is protected by the security application in order to rule out any manipulation. For example, the security application can authenticate this system service with respect to the file server, so that any change in the system service can be recognized by the security application by means of the then absent authentication. As stated above, the security application is largely fail-safe, so that this security application can be used as a non-manipulable trust center.

The aforementioned migration administrator can copy, for example, data to the highly secure file server without having to gain plain text access to the files stored on the file server.

The network path between the client and the file server, to which the unencrypted files are transferred, is secured by an encrypted protocol (for example, IPsec). IPsec is integrated into the TCP/IP protocol stack of the Windows operating system and can be activated by a simple IP security guideline, and can be activated by a group agreement (group policy) on the relevant Windows client. In order to simplify the configuration, highly secure file servers can be allocated to a specific IP subnet. The following settings lend themselves well for this purpose.

The file server is configured in such a way that all clients who want to communicate with the file server by use of a CIFS protocol (for example, over TCP ports 139 and 445) have to use the IPsec protocol. Only non-critical exceptions are allowed for the individual operating servers (for example, jump server, monitoring server, patch server).

The clients are configured in such a way that they have to use the IPsec protocol, when they want to communicate with the net segment of the secure file server by use of a CIFS protocol. A corresponding IP security guideline can be distributed automatically to the clients.

For the sake of completeness it must be mentioned that a jump server is a server, onto which an administrator has to log on, in order to gain access to the file server. This feature has the advantage that all access goes over a central unit (the jump server), which can be designed for suitable security requirements and can be monitored accordingly. A monitoring server is a server, on which the monitoring programs run that check the status of the file server. If problems arise, the monitoring server triggers an alarm. A patch server is a central server, on which program related security updates are made available (patches) that can be loaded and installed by the file server.

The data storage on the client can take place by way of a (local) hard disk encryption. The interaction with the solution described herein is ensured, because the encryption on the file server is transparent to the client and does not collide with the local hard disk encryption.

After authentication of the authorized user, the user obtains an additional drive (which can be recognized, for example, by an additional drive letter), on which he can store the sensitive files. In many areas the authentication by use of his user identification and a password can ensure adequate security with a simultaneously high practicality and user acceptance. As an alternative, it is possible to provide additional authentication measures (for example, intensive authentication or two factor authentication) that render a successful unauthorized access more difficult (chip card, alternating access code, improved passwords, additional authentication, fingerprint, biometric authentication, etc.).

Other Advantages:

The invention proposed herein enables the storage of secure data—that is, server, storage and network administrators only have access to encrypted and, therefore, worthless files.

The encryption solution is transparent to the end user. The encryption solution is intuitive and simple to use and allows high acceptance.

Furthermore, hardly any negative effects regarding the processing speed are detectable; the encryption and decryption on the file server takes place without any perceptible delay.

Access to protected files and/or directories can be stored and monitored in a granular way and in a non-manipulable way for the administrators. This feature enables documentation and, thus, transparency of the actually achieved security.

Access control lists (access control lists, ACLs) can be used to manage the access rights.

The inventive solution eliminates the need for the storage zones to be provided with isolated storage systems, which are provided especially for this purpose and that incur high costs while at the same time exhibit the customary limited availability. Rather, the solution can be integrated into an existing infrastructure. The system administration can be performed by the existing administration, a feature that permits a high availability (24 hours service, seven days a week) at a cost that is in essence unchanged. Those portions of the solution that cannot be borne by the existing administration (for example, the security application) need a significantly reduced availability. In this case, however, a centralized approach can be used for a joint administration of a plurality of secure file servers. In addition, it must be pointed out that the file servers described herein can also be application servers that are configured according to the proposed approach.

List of Abbreviations:
ACL Access Control List
CIFS Common Internet File System
DAS Direct Attached Storage
DFS Distributed File System
DFSR DFS Replication
IP Internet Protocol
IPSec IP Security
LAN Local Area Network
NAS Network Attached Storage
PEM Policy Enforcement Module RFC Request for Comments
SAN Storage Area Network
SSL Secure Socket Layer
TCP Transmission Control Protocol
TLS Transport Layer Security
WAN Wide Area Network The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for accessing files of a secure file server, the method comprising the acts of:
   authenticating a user or a process requesting access to the secure file server;
   accessing, by the user or process, the files of the secure file server by way of an encryption module of the secure file server;
   wherein:
      the encryption module comprises an encryption agreement of a centralized security application; and
      access by an authenticated user or authenticated process to the secure file server factors into consideration the encryption agreement, wherein the files of the secure file server are stored on a storage array together with unencrypted files of a normal file server, wherein the storage array is independently accessible by the normal file server and by the secure file server, wherein the user or process accesses the storage array via the normal file server using an unencrypted connection, while accessing the storage array via the secure file server using an encrypted connection factoring into consideration the encryption agreement.

2. The method according to claim 1, wherein the method controls the user's access in accordance with the following model:
   if access involves an authorized user, then the files are encrypted or decrypted by the encryption module of the secure file server;
   if access involves an administrator, then the access is allowed, but the files are neither encrypted nor decrypted;
   if access involves an unauthorized user, then the access is blocked.

3. The method according to claim 1, wherein the access of the authenticated user or the authenticated process to the secure file server takes place by way of an encrypted connection factoring into consideration the encryption agreement.

4. The method according to claim 1, wherein the act of authenticating the user or the process occurs by use of a user identification or a signature of the process, respectively.

5. The method according to claim 4, wherein the user is authenticated via a workstation computer by use of the user identification, and further wherein an encrypted transfer of files between the workstation computer and the secure file server is carried out.

6. The method according to claim 5, wherein the encrypted transfer between the workstation computer and the secure file server occurs via an IPSec protocol.

7. The method according to claim 1, further comprising the acts of:
   at least one of storing and monitoring an access or attempted access to the secure file server.

8. The method according to claim 1, wherein the act of authenticating the process takes place by the centralized security application.

9. The method according to claim 8, wherein the process is authenticated via a signature by the secure file server.

10. The method according to claim 8, wherein the process is authenticated by the encryption module of the secure file server.

11. The method according to claim 1, wherein the access to the files of the secure file server is controlled via the encryption agreement as a function of a type of process.

12. The method according to claim 11, wherein the type of process is an anti-virus program provided with full access to the files of the secure file server via the encryption agreement.

13. The method according to claim 1, wherein file contents are encrypted via the encryption module and wherein metadata of a file are not encrypted.

14. The method according to claim 1, further comprising the act of:
   backing-up on the storage array files of the secure file server.

15. The method according to claim 14, further comprising the act of:
   backing-up on the storage array files of the normal file server together with the files of the secure file server.

16. A secure file server for making available data files, the server comprising:
   an encryption module comprising an encryption agreement of a centralized security application; and
   a processing unit, which comprises at least one of a processor and at least a partially hard-wired circuit configuration, wherein the processing unit is operatively configured such that:
   a user or a process, requesting access to the secure file server, is authenticated;
   access to the data files by the user or process occurs via the encryption module;
   access of an authenticated user or an authenticated process occurs while factoring into consideration the encryption agreement, wherein the data files of the secure file server are stored on a storage array together with unencrypted files of a normal file server, wherein the storage array is independently accessible by the normal file server and by the secure file server, wherein the user or process accesses the storage array via the normal file server using an unencrypted connection, while accessing the storage array via the secure file server using an encrypted connection factoring into consideration the encryption agreement.

17. A computer network, comprising:
   at least one normal server configured for making available data files;
   at least one secure file server configured for making available data files, said at least one secure file server comprising:
      an encryption module comprising an encryption agreement of a centralized security application; and a processing unit operatively configured such that:
- a user or a process, requesting access to the secure file server, is authenticated
- access to the data files by the user or process occurs via the encryption module;
- access of an authenticated user or an authenticated process occurs while factoring into consideration the encryption agreement, wherein the data files of the secure file server are stored on a storage array together with unencrypted files of the normal file server, wherein the storage array is independently accessible by the normal file server and by the secure file server, wherein the user or process accesses the storage array via the normal file server using an unencrypted connection, while accessing the storage array via the secure file server using an encrypted connection factoring into consideration the encryption agreement.

* * * * *